US011110984B1

(12) United States Patent
McKinney

(10) Patent No.: US 11,110,984 B1
(45) Date of Patent: Sep. 7, 2021

(54) VEHICLE HANDLEBAR HEATING SYSTEM AND METHOD

(71) Applicant: Christopher R. McKinney, Port Charlotte, FL (US)

(72) Inventor: Christopher R. McKinney, Port Charlotte, FL (US)

( * ) Notice: Subject to any disclaimer, the term of this patent is extended or adjusted under 35 U.S.C. 154(b) by 277 days.

(21) Appl. No.: 15/613,026

(22) Filed: Jun. 2, 2017

Related U.S. Application Data

(60) Provisional application No. 62/345,186, filed on Jun. 3, 2017.

(51) Int. Cl.
*B62J 33/00* (2006.01)
*B62K 21/12* (2006.01)
*B62K 21/26* (2006.01)

(52) U.S. Cl.
CPC .............. *B62J 33/00* (2013.01); *B62K 21/12* (2013.01); *B62K 21/26* (2013.01)

(58) Field of Classification Search
CPC ........... B62J 33/00; B62K 21/12; B62K 21/26
USPC .................................................... 237/12.3 B
See application file for complete search history.

(56) References Cited

U.S. PATENT DOCUMENTS

| | | | | |
|---|---|---|---|---|
| 610,328 A | * | 9/1898 | Martin .................... | B62K 21/12 74/551.1 |
| 822,487 A | * | 6/1906 | Smith .................... | B62K 21/12 74/551.1 |
| 1,156,637 A | * | 10/1915 | Shultz .................... | B60H 1/038 237/12.3 R |
| 1,262,392 A | * | 4/1918 | Saint Clair ............ | B60H 1/038 237/12.3 R |
| 1,983,907 A | * | 12/1934 | Lindner .................... | B62J 33/00 237/12.3 R |
| 3,655,219 A | * | 4/1972 | Jacoby .................... | B62K 21/16 280/279 |

(Continued)

FOREIGN PATENT DOCUMENTS

| | | | | |
|---|---|---|---|---|
| DE | 19722919 A1 | * | 12/1998 | ............. B62K 21/26 |
| FR | 2252945 A1 | * | 6/1975 | ............. B62J 33/00 |

(Continued)

OTHER PUBLICATIONS

Carlon, DE 19722919 A1 English abstract, Dec. 3, 1998 (Year: 1998).*

*Primary Examiner* — Kenneth J Hansen
*Assistant Examiner* — Phillip Decker
(74) *Attorney, Agent, or Firm* — John Rizvi; John Rizvi, P A.—The Patent Professor®

(57) ABSTRACT

A vehicle handlebar heating system and method are provided, including a handlebar assembly having a hollow handlebar member defining an internal cavity, and a fluid heating system for circulating heated fluid through the hollow internal cavity. The handlebar member generally includes a central mounting portion, and first and second end portions extending from the central mounting portion. The handlebar assembly further includes a fluid inlet port and a fluid outlet port formed through the handlebar member. The fluid inlet port and the fluid outlet port are in fluid communication with the first cavity section and the second cavity section of the internal cavity. A fluid passageway is provided from the fluid inlet port to the fluid outlet port via the first and second cavity sections.

14 Claims, 9 Drawing Sheets

(56) References Cited

U.S. PATENT DOCUMENTS

| | | | | |
|---|---|---|---|---|
| 4,022,378 A * | 5/1977 | Essiembre | ......... | B60H 1/00271 |
| | | | | 165/43 |
| 4,347,893 A * | 9/1982 | Moyer | ..................... | B60H 1/14 |
| | | | | 165/44 |
| 4,506,552 A * | 3/1985 | Brown | ...................... | G01F 1/66 |
| | | | | 73/861.28 |
| 4,690,632 A * | 9/1987 | Carrow | .................. | B29C 41/06 |
| | | | | 249/137 |
| 5,832,785 A * | 11/1998 | Costahaude | ........... | B62K 21/12 |
| | | | | 74/551.1 |
| 6,122,991 A * | 9/2000 | Clarkson | ................ | B62K 11/14 |
| | | | | 74/551.1 |
| 6,742,795 B2 * | 6/2004 | Liao | ...................... | B62K 21/12 |
| | | | | 280/274 |
| 6,844,524 B2 * | 1/2005 | Downey | .................. | B62J 33/00 |
| | | | | 219/204 |
| 6,994,150 B1 * | 2/2006 | Kline | ....................... | B62J 27/00 |
| | | | | 123/196 AB |
| 2009/0049949 A1 * | 2/2009 | Chen | ...................... | B62K 21/12 |
| | | | | 74/551.1 |
| 2010/0186542 A1 * | 7/2010 | Hashimoto | ............ | B21D 53/86 |
| | | | | 74/551.1 |
| 2016/0096579 A1 * | 4/2016 | Nordberg | ............... | B62K 21/12 |
| | | | | 74/551.1 |

FOREIGN PATENT DOCUMENTS

| | | | | |
|---|---|---|---|---|
| FR | 2983824 A1 * | 6/2013 | ............ | B62K 21/14 |
| GB | 2343869 A * | 5/2000 | ............ | B62J 33/00 |

\* cited by examiner

VEHICLE HANDLEBAR HEATING SYSTEM AND METHOD

CROSS-REFERENCE TO RELATED APPLICATIONS

This Application claims the benefit of U.S. Provisional Patent Application Ser. No. 62/345,186, filed on Jun. 3, 2016, which is incorporated herein in its entirety.

FIELD OF THE INVENTION

The present invention relates generally to handlebar heating systems for use with cold weather vehicles, and more particularly, to a handlebar heating system and method utilizing a heated fluid.

BACKGROUND OF THE INVENTION

It is important when operating many types of handlebar steered vehicles in cold weather to keep one's hands warm for both comfort and safety. These vehicles may include motorcycles, all-terrain vehicles or ATVs, cold weather jet skis, snowmobiles, snowbikes, etc. This is particularly true with snowmobiles and snowbikes as they are very often operated in remote back country or mountainous areas where little assistance or shelter is available.

Current handlebar heating systems generally include one or more electric heating coils or electric heating elements provided in the ends or handgrip portions of the handlebars of the vehicles. These are common in both motorcycles and snowmobiles. The electric heating coils operate off the vehicle's battery or directly off the alternator in the absence of a battery.

Due to the high energy needed to raise the temperature of the handlebars to safe and comfortable levels in very cold temperatures, the energy required can cause a severe drain on the vehicle's electrical system and may impair operation of the vehicle and its other electrical functions such as, for example, headlights, etc. Since snowmobiles are often operated at night, the loss of power for the headlights may become a major safety issue.

Additionally, the handlebars of many snowmobiles are manufactured from cast or extruded aluminum which has a very high thermal conductivity. This results in much of the heat provided to the handgrips of the handlebars to be lost to the surrounding atmosphere, thus producing a higher drain on the electrical system as well as less heat provided to the hands of the operator. With less heat available to the operator, the operator is constantly battling cold hands, resulting in the above safety and comfort issues. Further, since the heat provided by the current electrical heating systems is localized to just the ends or handgrips of the handlebars, the wrists and forearms of the operator may still get cold.

Accordingly, there is an established need for an alternative system and method of heating the handlebars of a cold weather vehicle which solves at least one of the aforementioned problems. For instance, there is a need for a handlebar-heating system that does not increase the drain on the vehicle's electrical system. Further, there is an established need for an alternative heating system and method that heats the entire handlebar system of a cold weather vehicle for increased comfort and safety during cold weather operation.

SUMMARY OF THE INVENTION

The present invention is directed to a vehicle handlebar heating system and method, including a handlebar assembly having a hollow handlebar member defining an internal cavity. A fluid heating system is provided for circulating heated fluid through the hollow internal cavity. The handlebar member generally includes an opposite first and second end portions for the gripping of a user's hands. The handlebar assembly further includes a fluid inlet port and a fluid outlet port formed through the handlebar member. A passageway is provided in the internal cavity, allowing heated fluid to flow from the fluid inlet to the fluid outlet past the first and second end portions of the handlebar member, thereby heating the first and second end portions of the handlebar member.

Introducing a first embodiment of the invention, the present invention consists of a handlebar heating system for circulating heated fluid through a handlebar of a vehicle, comprising:

a handlebar assembly including a hollow handlebar member defining an internal cavity, the handlebar member including opposite first and second end portions configured to be gripped by a user's hands, the internal cavity comprising a first cavity section arranged at the first end portion and a second cavity section arranged at the second end portion;

the handlebar assembly further including a fluid inlet port and a fluid outlet port formed through the handlebar member; wherein the fluid inlet port and the fluid outlet port are in fluid communication with the first cavity section and the second cavity section of the internal cavity, respectively, and a fluid passageway is provided from the fluid inlet port to the fluid outlet port via the first and second cavity sections.

In a second aspect, the heated fluid can be vehicle engine oil.

In another aspect, the heated fluid can be vehicle engine coolant.

In another aspect, the fluid inlet port and the fluid outlet port can be located in horizontally spaced relation to each other on an underside of a central portion of the hollow handlebar member.

In yet another aspect, the first and second end portions can be made of at least one thermally conductive material.

In another aspect, the handlebar heating system can further include a first thermally conductive grip and a second thermally conductive grip fitted over the first and second end portions of the handlebar member, respectively.

In another aspect, each thermally conductive grip can include a thermally conductive flange on an inner end thereof.

In yet another aspect, the handlebar heating system can further include a first internal tube and a second internal tube. The internal tube can be connected to and in fluid communication with the fluid inlet port and the second internal tube can be connected to and in fluid communication with the fluid outlet port. The internal cavity can extend uninterruptedly from the first cavity section to the second cavity section. The first internal tube can be configured to direct the heated fluid from the fluid inlet port to the first end portion of the handlebar member. The second internal tube can be configured to collect fluid located in the second end portion of the handlebar member and direct the collected fluid to the fluid outlet tube.

In another aspect, the first internal tube and the second internal tube can be made from a thermally conductive material.

In another aspect, the first internal tube can extend from the fluid inlet port to a first point within the hollow handlebar member just short of an end wall of the second end portion.

In turn, the second internal tube can extend from the fluid outlet port to a second point within the hollow handlebar member just short of an end wall of the first end portion.

In yet another aspect, the fluid inlet port and the fluid outlet port can be configured to disconnectably connect to a fluid inlet tube and a fluid outlet tube, respectively, which are external to the handlebar assembly.

In another aspect, the first cavity section and second cavity section can be separated from one another, and an internal tube can extend within the handlebar member and provide fluid communication between the first cavity section and the second cavity section.

In another aspect, the fluid inlet port can be arranged in the first cavity section and the fluid outlet port can be arranged in the second cavity section.

In yet another aspect, opposite ends of the internal tube can be arranged just short of opposite end walls of the handlebar member.

In another aspect, the first and second cavity sections can be separated and isolated from one another by a central blocking element positioned within the handlebar member, with the internal tube arranged extending through the central blocking element.

In another aspect, the central blocking element can be formed of a thermally-insulating material.

In yet another aspect, the handlebar heating system can further include a control valve for controlling the amount of fluid entering the handlebar assembly via the fluid inlet port.

Introducing a method of heating a vehicle handlebar, comprising the steps of:

providing a handlebar assembly including a hollow handlebar member defining an internal cavity, the handlebar member including opposite first and second end portions configured to be gripped by a user's hands, the internal cavity comprising a first cavity section arranged at the first end portion and a second cavity section arranged at the second end portion, the handlebar assembly further including a fluid inlet port and a fluid outlet port formed through the handlebar member, wherein the fluid inlet port and the fluid outlet port are in fluid communication with the first cavity section and the second cavity section of the internal cavity, respectively, and a fluid passageway is provided from the fluid inlet port to the fluid outlet port via the first and second cavity sections;

providing fluid communication between the fluid inlet port and an external heated fluid source via a fluid inlet tube;

circulating heated fluid from the external heated fluid source into the fluid inlet port via the fluid inlet tube;

heating the first and second end portions of the handlebar member by the heated fluid passing through the first and second cavity sections, respectively; and allowing the heated fluid to flow out of the handlebar member via the fluid outlet port.

In a second aspect, the method can further include the steps of:

providing fluid communication between the fluid outlet port and the external heated fluid source via a fluid outlet tube, and returning the heated fluid to the external heated fluid source through the fluid outlet tube.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an effective and safe handlebar heating system for use in cold weather vehicles such as but not limited to snowmobiles, snowbikes, motorcycles, all-terrain vehicles (ATVs) and cold weather jet skis. The handlebar heating system heats the handlebar using hot vehicle coolant or oil, and thus prevents a drain on the vehicle's electrical system.

Figure 1:
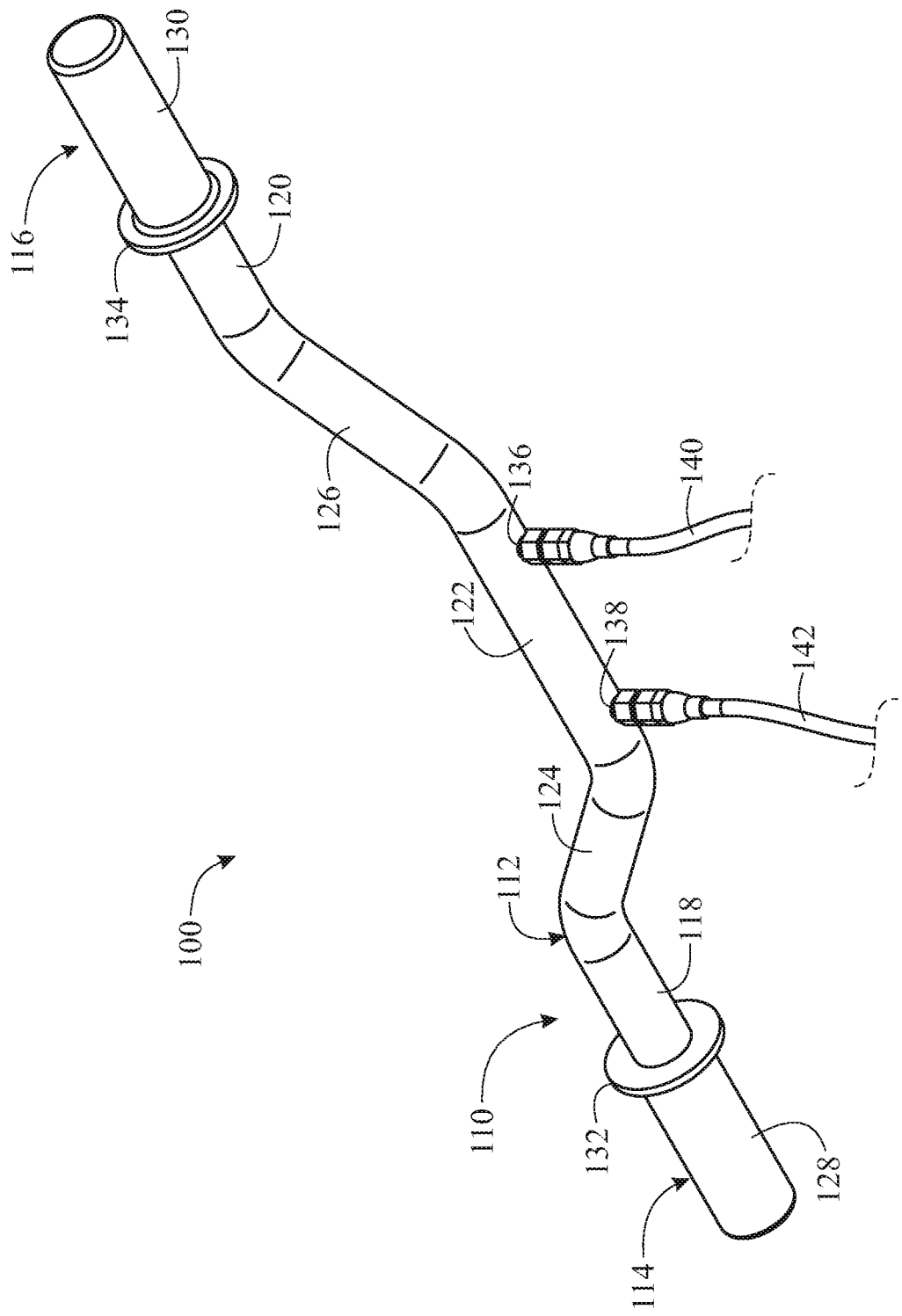
FIG. 1 presents a bottom, front perspective view of a handlebar heating system in accordance with a first illustrative embodiment of the invention.
Figure 2:
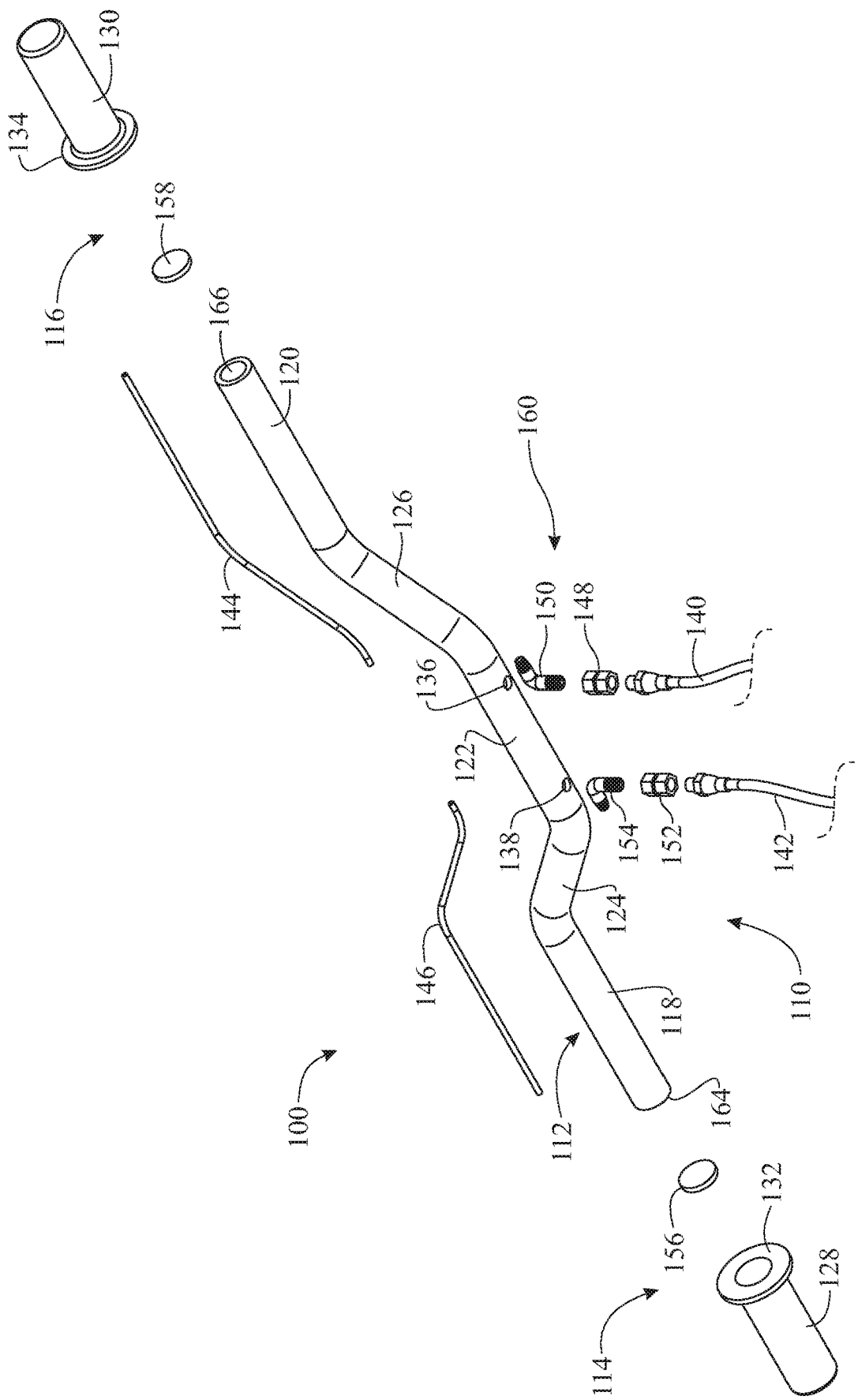
FIG. 2 presents a bottom, front perspective view of the handlebar heating system of FIG. 1, shown exploded.

Referring initially to FIGS. 1 and 2, a handlebar heating system 100 is illustrated in accordance with an exemplary embodiment of the present invention, configured as a fluid heated handlebar. As shown, the handlebar heating system 100 generally includes a handlebar assembly 110 for receipt of a heated fluid. The handlebar assembly 110 includes a hollow handlebar member 112 having first and second handgrips 114 and 116 located on first and second end portions 118 and 120, respectively, of the hollow handlebar member 112. The handlebar member 112 additionally includes a central mounting portion 122 for attaching the handlebar assembly 110 to a vehicle, and transition portions 124 and 126 extending from the central mounting portion 122 to the first and second end portions 118 and 120. The transition portions 124 and 126 raise the handgrips 114 and 116 on the first and second end portions 118 and 120 to a comfortable level for the operator. The handlebar assembly 110 may be specifically provided as part of the handlebar heating system 100; alternatively, the handlebar assembly 110 may be provided with the vehicle and adapted for use with the disclosed fluid heating systems.

In order to transmit heat provided by a coolant or oil system of a vehicle from the handlebar member 112 to the hands of the user, the first and second handgrips 114 and 116 include thermally conductive grips 128 and 130. End flanges 132, 134 can optionally be provided on the inner ends of the thermally conductive grips 128 and 130 to prevent the hands of the operator from slipping inward on the handlebar member 112. The end flanges 132, 134 may also be made from a thermally conductive material.

The handlebar heating assembly 110 additionally includes an inlet port 136 and an outlet port 138, both extending through the central mounting portion 122 of the handlebar member 112. The inlet port 136 and the outlet port 138 are located in horizontally spaced relation to each other on the underside of the central mounting portion 122. The inlet and outlet ports 136 and 138 are provided to allow passage of heated fluid into the handlebar member 112 from an external source, such as the vehicle's oil or cooling systems, and return or circulate the fluid back to those systems. In order to pass or transfer the fluid into and out of the handlebar member 112, the handlebar heating system 100 further includes a fluid inlet tube 140 and a fluid outlet tube 142.

Figure 3:
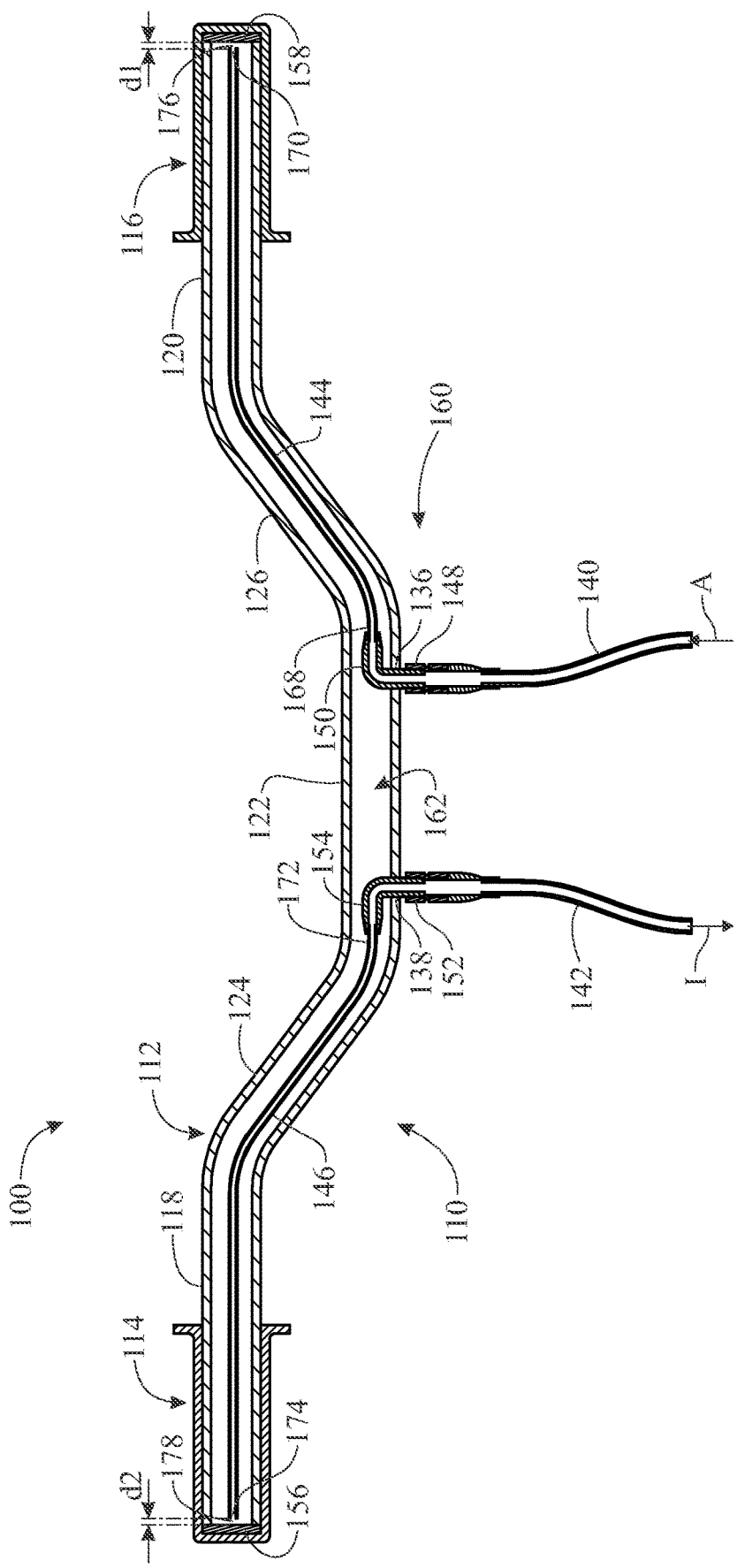
FIG. 3 presents a cross-sectional front elevation view of the handlebar heating system of FIG. 1.

As best shown in FIGS. 2 and 3, the handlebar heating system 100 additionally includes a pair of hollow internal tubes including a first internal tube 144 and a second internal tube 146. The first internal tube 144 receives heated fluid from the inlet tube 140 and directs the heated fluid toward and through the second end portion 120 of the handlebar member 112. The second internal tube 146 is provided to collect the fluid located in the first end portion 118 of the handlebar member 112 and return it back to the system through the outlet tube 142 as described in more detail hereinbelow.

A first connector 148 is provided and connects the inlet tube 140 to a first elbow 150 passing through the inlet port 136. The first elbow 150 is affixed through the inlet port 136 in a sealed manner such that no fluid can leak out of the hollow handlebar member 112. The first elbow 150 is connected to the first internal tube 144. Similarly, the outlet tube 142 is connected to a second connector 152. A second elbow 154 is provided and extends through the outlet port 138. The second elbow 154 is connected to the second connector 152 and to the second internal tube 146. The second elbow 154 is also affixed through the handlebar member 112 in such a sealed manner as to prevent any fluid leakage. The first and second connectors 148 and 152 are detachable from the inlet and outlet tubes 140, 142, respectively, to allow the handlebar assembly 110 to be removed from the vehicle for service and repair.

End caps 156 and 158 are provided on the first and second end portions 118 and 120 of the hollow handlebar member 112, respectively, to provide a corresponding end wall to the first and second end portions 118 and 120 and seal the hollow handlebar member 112 against fluid leakage. The end caps 156 and 158 may be provided separately and sealingly affixed to the handlebar member 112 or may be formed integrally with the handlebar member 112.

Referring now specifically to FIG. 3, the inlet and outlet tubes 140 and 142, together with the first and second internal tubes 144 and 146 form the basis of a fluid heating system 160 of the handlebar heating system 100. The fluid heating system 160 is designed to take heated fluid (not shown) from the vehicle and circulate it through an internal cavity 162 of the handlebar member 112. The first and second elbows 150 and 154 as well as the first and second connectors 148 and 152 also form part of the fluid heating system 160.

As further shown in FIG. 3, the first internal tube 144 extends from the first elbow 150 to a point within the hollow handlebar member 112 just short of the end cap 158 affixed in the open end 166 of the second end portion 120. Likewise, the second internal tube 146 extends from the second elbow 154 to a point within the hollow handlebar member 112 just short of the end cap 156 affixed in the open end 164 of the first end portion 118 of the hollow handlebar member 112. Specifically, a first or inlet end 168 of the first internal tube 144 is affixed to the first elbow 150 while a second or outlet end 170 of the first internal tube 144 is located a spaced distance d1 from the end cap 158. This allows heated fluid flowing through the first internal tube 144 to pass out of the open outlet end 170 and into the cavity 162 of the handlebar member 112 to heat the handlebar assembly 110.

In similar manner, a first or outlet end 172 of the second internal tube 146 is connected to the second elbow 154, and a second or open inlet end 174 of the second internal tube 146 is located a spaced distance d2 from the end cap 156 positioned within the end of the first end portion 118. The distance d2 allows fluid within the cavity 162 of the handlebar member 112 to flow around the second internal tube 146 and into the open inlet end 174 to return the fluid to the second internal tube 146 and further to the outlet tube 142. The distance d1 forms a gap 176 between the outlet end 170 of the first internal tube 144 and the end cap 158, and the distance d2 forms a gap 178 between the inlet end 174 of the second internal tube 146 and the end cap 156.

The components of the handlebar heating system 100 may be formed from a variety of thermally conductive and non-conductive materials. For example, as noted above, the handlebar members 112 of many snowbikes and snowmobiles are often formed from aluminum which is a material having a high thermal conductivity. Alternatively, the handlebar member 112 may be formed from other metallic materials such as, but not limited to, steels such as stainless steel or steel alloys. When forming the entire handlebar member 112 out of a thermally conductive material, the entire handlebar member 112 will be heated by the fluid heating system 160 and provide warmth to an operator's hands as well as the wrists and arms. Alternatively, the handlebar member 112 may be formed from both thermally conductive and relatively non-conductive materials to localize the heating effect to the handgrips 114 and 116. For example, the central mounting portion 122 and the transition portions 124, 126 of the handlebar member 112 may be formed from a relatively non-thermally conductive material such as various polymeric materials while the first and second end portions 118 and 120, respectively, are formed as above from a material having a high thermal conductivity so as to transfer heat to the thermally conductive grips 128 and 130. In turn, the thermally conductive grips 128 and 130 of the handgrips 114 and 116 can be formed from a thermally conductive material or from a composite having a thermally conductive material embedded therein. For example, the conductive grips 128 and 130 may be formed from an aluminum or aluminum alloy or from a soft, polymeric material having conductive material embedded therein. Should the first and second end portions 118 and 120 of the handlebar member 112 get warm enough, the conductive grips 128 and 130 may be formed strictly from a relatively thermally conductive polymeric or natural material, for instance and without limitation.

Figure 4:
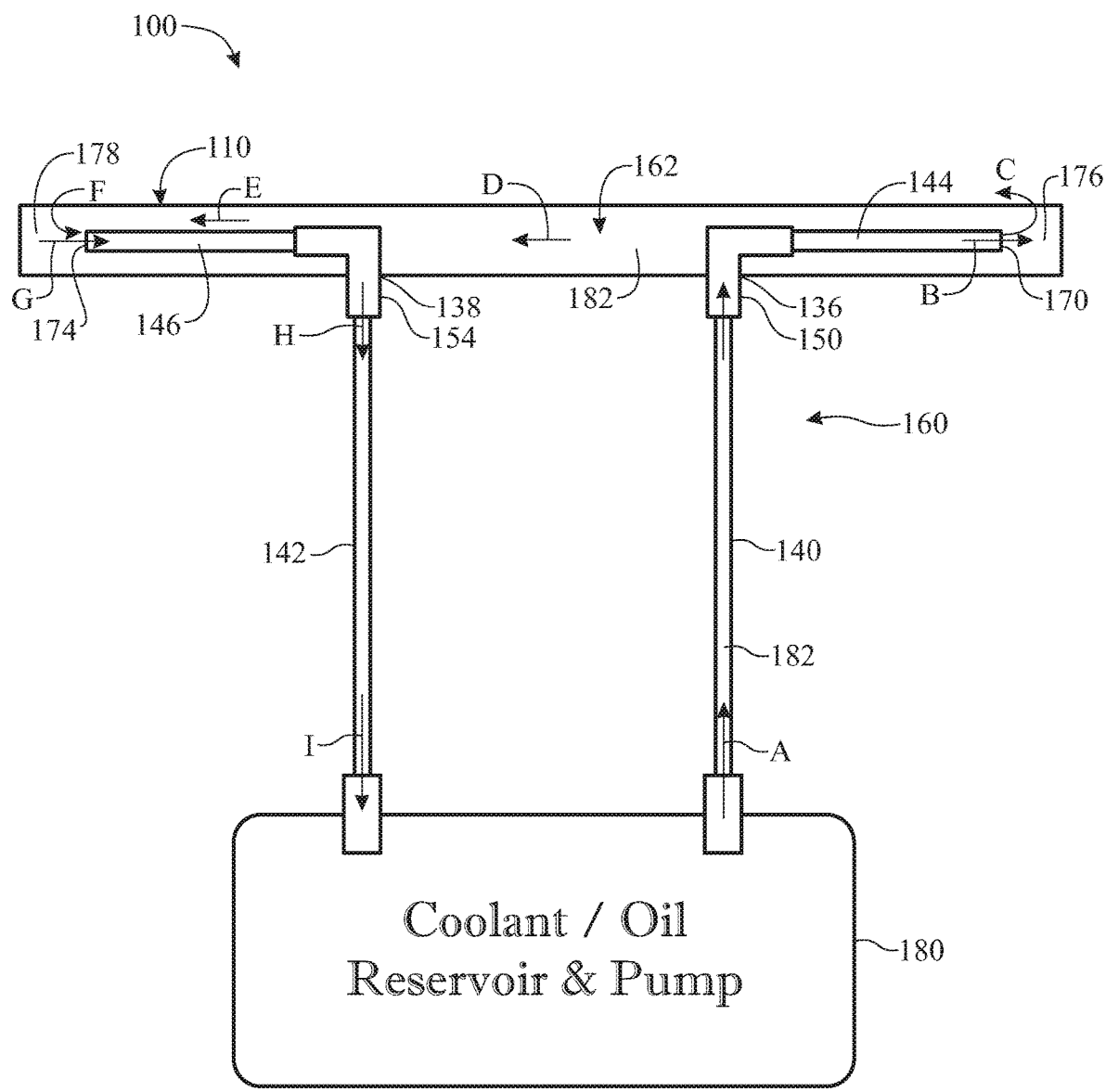
FIG. 4 presents a schematic diagram of the handlebar heating system of FIG. 1.

Turning now to FIGS. 3 and 4, in use, the fluid heating system 160 of the handlebar heating system 100 can draw heated fluid from a coolant or oil reservoir or pump as a source of heated fluid 180 (FIG. 4). The fluid heating system 160 passes the heated fluid 182 through the handlebar assembly 110 to heat at least the handgrips 114 and 116 (FIG. 3) of the handlebar assembly 110. The heated fluid 182 may be oil from the engine's oil system which is heated due to friction in the engine during operation or engine coolant which circulates through the engine and draws heat from the operation of the engine to keep it from overheating.

The preferred heated fluid 182 is vehicle engine coolant from the vehicle engine cooling system. In a preferred embodiment of the invention, the fluid heating system 160 is connected to the vehicle in such a way that the fluid heating system 160 and the vehicle engine cooling system form a single closed, pressurized circuit where vehicle engine coolant from the vehicle engine cooling system flows through the fluid heating system 160 and back to the vehicle engine cooling system, without mixing with the engine. Connecting the fluid heating system 160 to the existing coolant circuit and adding an extra circuit amount of coolant to the coolant circuit of the vehicle (in order to install the fluid heating system 160 in an existing vehicle) has no adverse effects on the engine or other parts of the vehicle; for instance, when the vehicle is stopped, the coolant from the handlebar does not fall towards the engine and is at no risk of soaking the engine or causing other negative effects on the engine. In other words, the closed, existing loop vehicle cooling system is not compromised by adding additional capacity. The coolant volume inside the handlebar is maintained regardless of whether the engine is on or off. This maintains the heat in the handlebar assembly 110 when the engine is turned off for short periods of time. A further advantage of having the fluid heating system 160 form a closed circuit with the vehicle coolant system is that the heated fluid 182 can be supplied to the fluid heating system 160 by the vehicle cooling system pumps, and no return pump or control mechanisms are required on the return side of the fluid circuit.

To heat the handlebar assembly 110 and, in particular, the handgrips 114 and 116, the heated fluid 182 passes out of the reservoir or source of heated fluid 180 and into the inlet tube 140 in the direction of arrow A (FIG. 4). The heated fluid 182 passes through the first connector 148 and the first elbow 150 and into the first internal tube 144. If the first internal tube 144 is made from a highly thermally conductive material, as the heated fluid passes through the first internal tube 144 in the direction of arrow B, the surrounding fluid within the cavity 162 of the handlebar member 112 is heated up and transfers heat to the handlebar member 112. As noted above, the entire handlebar member 112 may be heated by the heated fluid 182 of just the first and second end portions 118 and 120 transferring heat to the handgrips 114 and 116.

As the heated fluid 182 exits the outlet end 170 of the first internal tube 144, it hits the end cap 156 and recurves or flows back along the second end portion 120 and transition portion 126 (around the first internal tube 144) in the direction of arrow C, through the central mounting portion 122 in the direction of arrow D, and through the transition portion 124 and first end portion 118 (around the second internal tube 146) in the direction of arrow E. In other words, the heated fluid 182 circulates throughout the cavity 162, across the handlebar member 112. As it passes along the first internal tube 144, the heated fluid 182 transfers heat to the handgrip 116 and, optionally, the handlebar member 112. The heated fluid 182 then encounters the other end cap 158 within the first end portion 118 it turns in the direction of arrow F and flows into the inlet end 174 of the second internal tube 146. The heated fluid 182 then flows through the second internal tube 146 in the direction of arrow G, optionally further heating fluid within the cavity 162, and finally returns back to the source of heated fluid 180 through the second elbow 154, second connector 152 and outlet tube 142 in the directions of arrows H and I.

In this manner, the fluid heating system 160 of the handlebar heating system 100 operates to heat the handlebar assembly 110 for the comfort and convenience of the operator.

Figure 5:
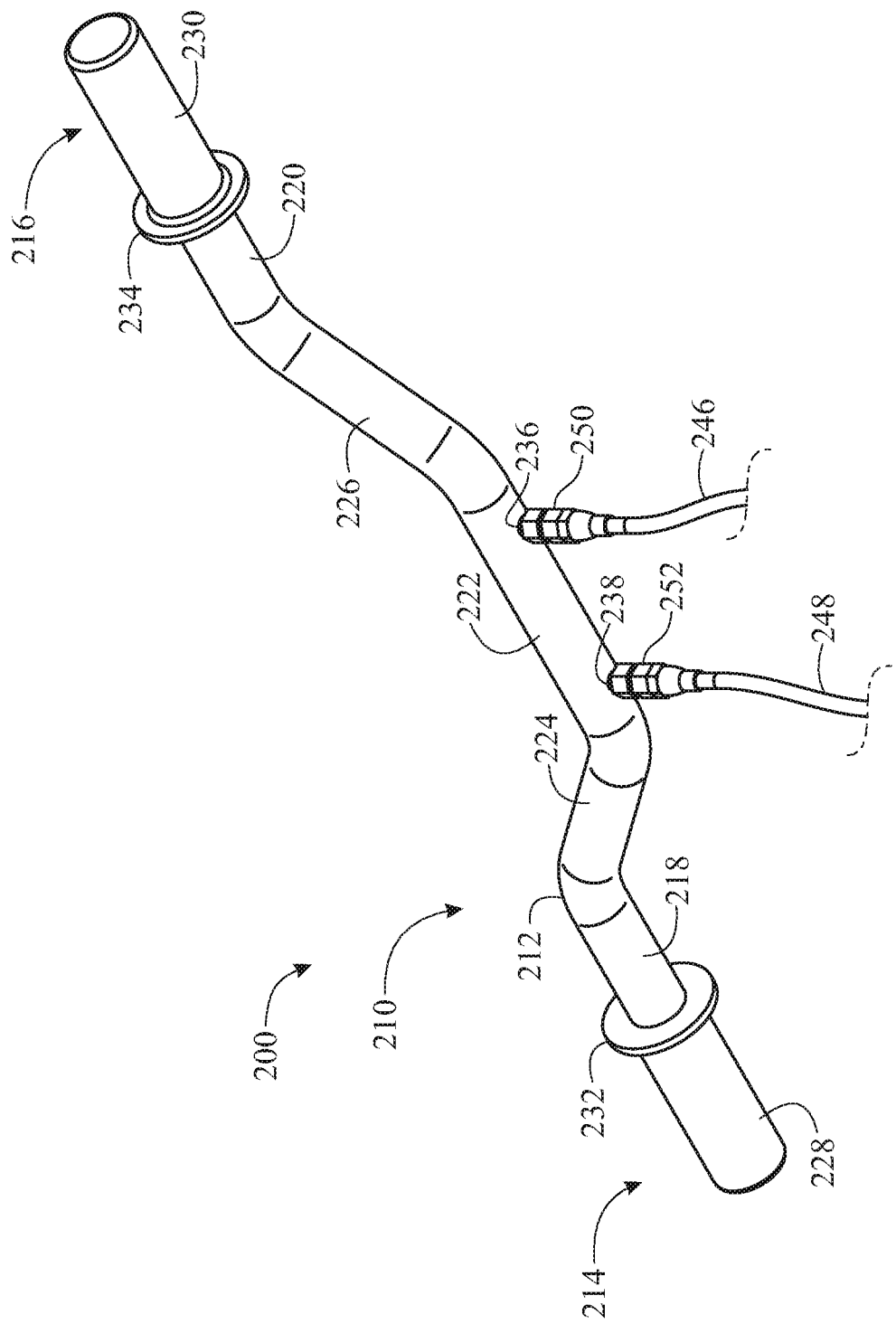
FIG. 5 presents a bottom, front perspective view of a handlebar heating system in accordance with a second illustrative embodiment of the invention.
Figure 6:
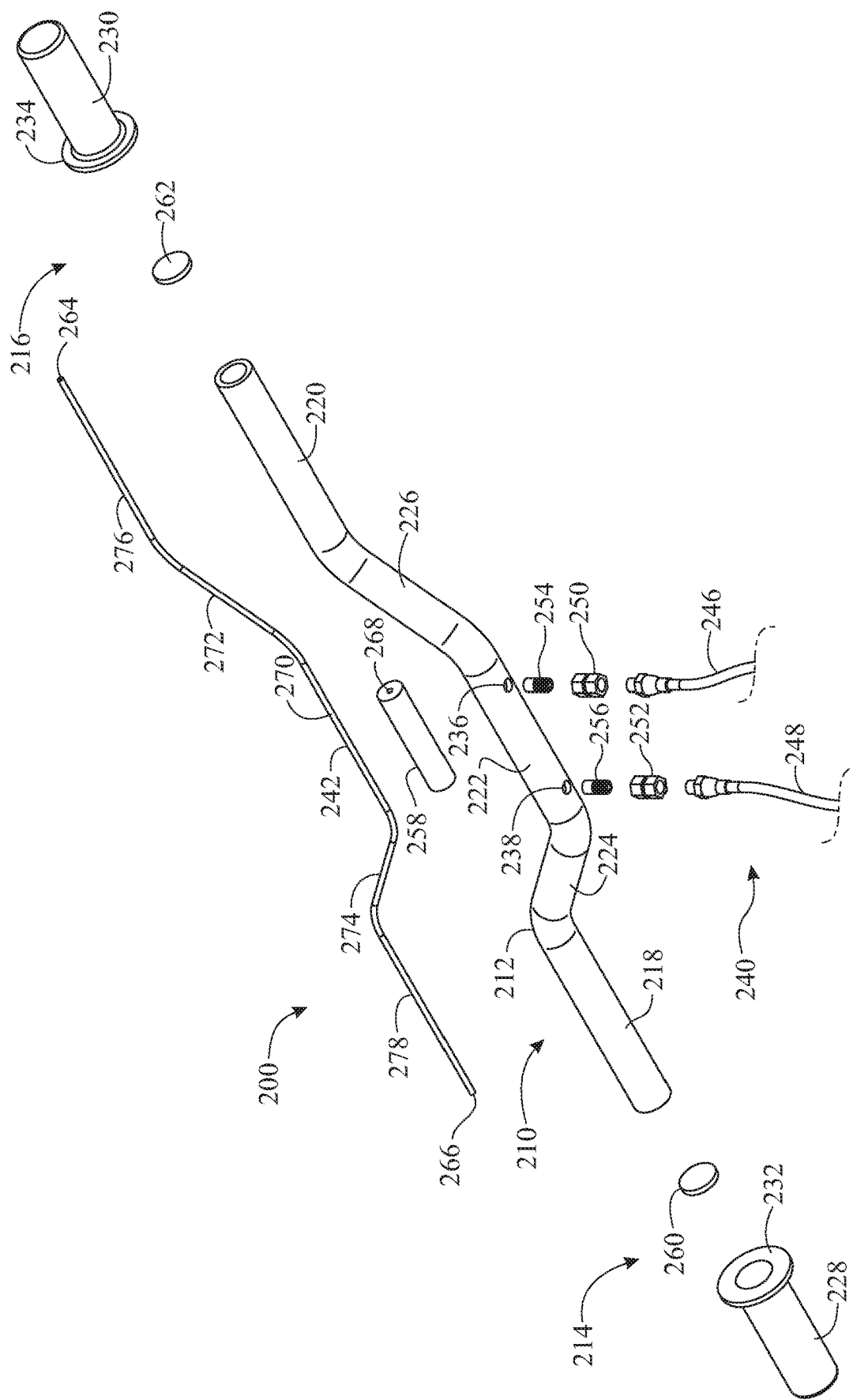
FIG. 6 presents a bottom, front perspective view of the handlebar heating system of FIG. 5, shown exploded.

Turning now to FIGS. 5-8, and initially with regard to FIGS. 5 and 6, there is disclosed an alternative embodiment of a handlebar heating system 200. The handlebar heating system 200 generally includes a handlebar assembly 210 which is similar to handlebar assembly 110 above. The handlebar assembly 210 generally includes a handlebar member 212 having handgrips 214 and 216 located on first and second end portions 218 and 220, respectively, of the handlebar member 212. The handlebar member 212 also includes a central mounting portion 222 and transition portions 224 and 226 extending between the central mounting portion 222 and the first and second end portions 218 and 220, respectively. The handgrips 214 and 216 include thermally conductive grips 228 and 230 and end flanges 232 and 234. An inlet port 236 and an outlet port 238 are provided through an underside of the central mounting portion 222.

Figure 7:
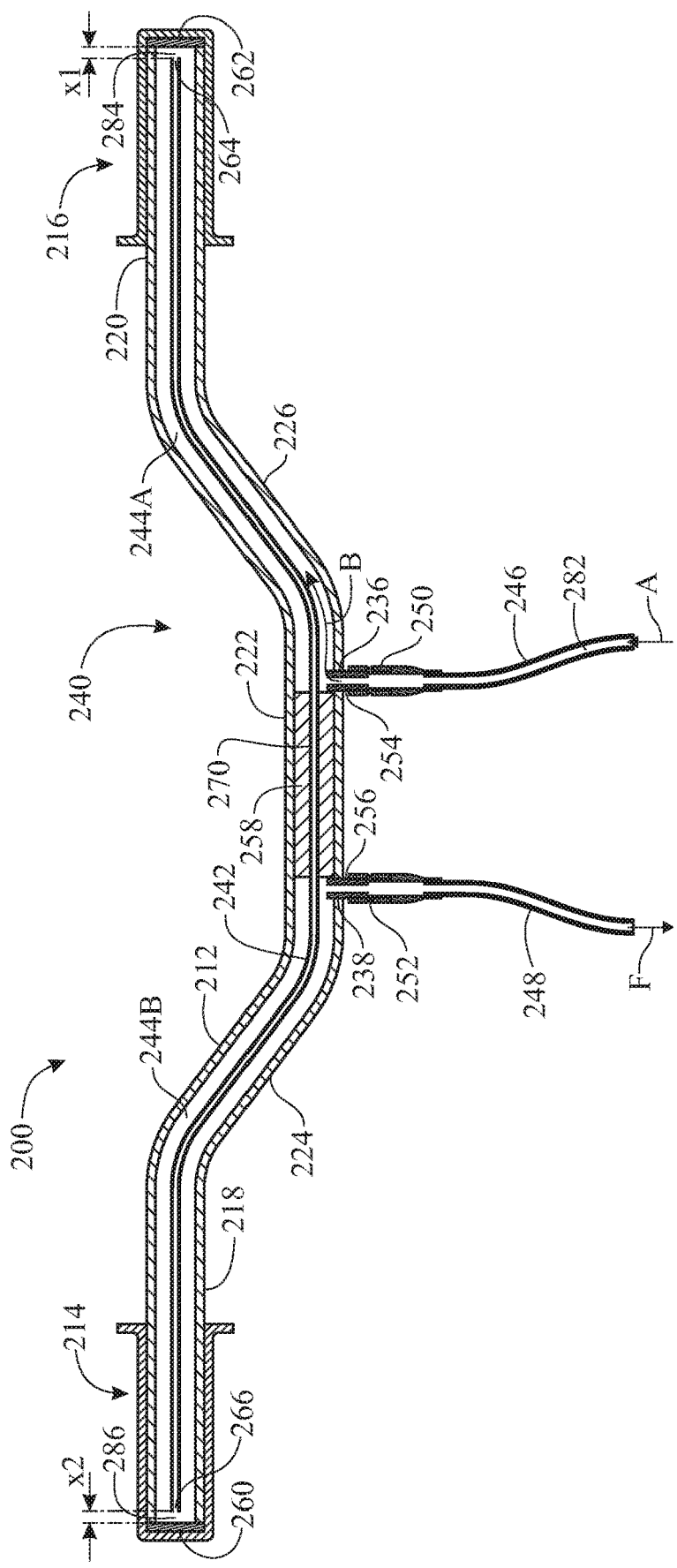
FIG. 7 presents a cross-sectional front elevation view of the handlebar heating system of FIG. 5.

Referring now to FIGS. 6 and 7, the handlebar heating system 200 also includes a fluid heating system 240 for circulating heating fluid through the handlebar assembly 210. However, in this embodiment, the fluid heating system 240 includes a single internal tube 242 for circulating heating fluid through a pair of internal cavities 244A and 244B (FIG. 7) formed within the handlebar member 212. In this embodiment, the internal tube 242 transfers heated fluid from internal cavity 244A to internal cavity 244B. The fluid heating system 240 further includes an inlet tube 246 and an outlet tube 248 for transferring fluid to and from an external fluid source, similarly to the previous embodiment.

As shown in FIGS. 5 and 6, the fluid system includes a first connector 250 affixed to the inlet tube 246 and a second connector 252 affixed to the outlet tube 248. A relatively straight inlet pipe 254 extends through and is sealed within the inlet port 236 of the handlebar member 212 and relatively straight outlet pipe 256 extends through and is sealed within the outlet port 238. The inlet pipe 254 is releasably connected to the inlet tube 246 through the first connector 250 and the outlet pipe 256 is releasably connected to the outlet tube 248 through the second connector 252. The inlet pipe 254 is open to, and in fluid communication with, the internal cavity 244A and the outlet pipe 256 is open to, and in fluid communication with, the internal cavity 244B.

As best shown in FIG. 7, in this embodiment, the internal cavities 244A and 244B, within the handlebar member 212 are separated by an internal, central blocking element 258 positioned within the central mounting portion 222 of the handlebar member 212. This isolates the heating fluid to two separate chambers or sections (internal cavities 244A and 244B) within the handlebar member 212. The central blocking element 258 may be formed from a variety of materials, including metals and polymers. In one contemplated embodiment, the central blocking element is formed by sealing the central mounting portion 222 with an epoxy surrounding the internal tube 242. Preferably, the central blocking element 258 is formed of a thermally-insulating material to maximize the heat provided to the first and second end portions 218 and 220 of the handlebar member 212. It should be noted that the remaining elements of the handlebar heading system 200 may be formed from materials and in a manner similar to that described hereinabove with regard to handlebar heating system 100.

With continued reference to FIG. 7, the internal tube 242 is provided to transfer heated fluid between these two separate sections or internal cavities 244A and 244B. Similar to that described hereinabove, the handlebar member 212 includes end caps 260 and 262 sealing the first and second end portions 218 and 220 against fluid leakage. As above, the end caps 260 and 262 may be provided separately and sealingly affixed to the handlebar member 212 or may be formed integrally with the handlebar member 212 to seal the internal cavities 244A and 244B. A first or inlet end 264 of the internal tube 242 is positioned within the second end portion 220 and spaced from the end cap 262 by a distance x1 and a second or outlet end 266 of the internal tube 242 is positioned within the first end portion 218 a distance x2 from the end cap 260.

As best shown in FIG. 6, the central blocking element 258 includes a through bore 268 through which the internal tube 242 extends. The internal tube 242 has an overall shape which follows the contours of the handlebar member 212 including a central portion 270, transition portions 272 and 274 and end portions 276 and 278. The internal blocking element 258 is sealed within the central mounting portion 222 of the handlebar member 212 and about the central portion 270 of the internal tube 242. Thus, the central portion 270 of the internal tube 242 passes through and is sealed within the through bore 268 of the central blocking element 258.

Figure 8:
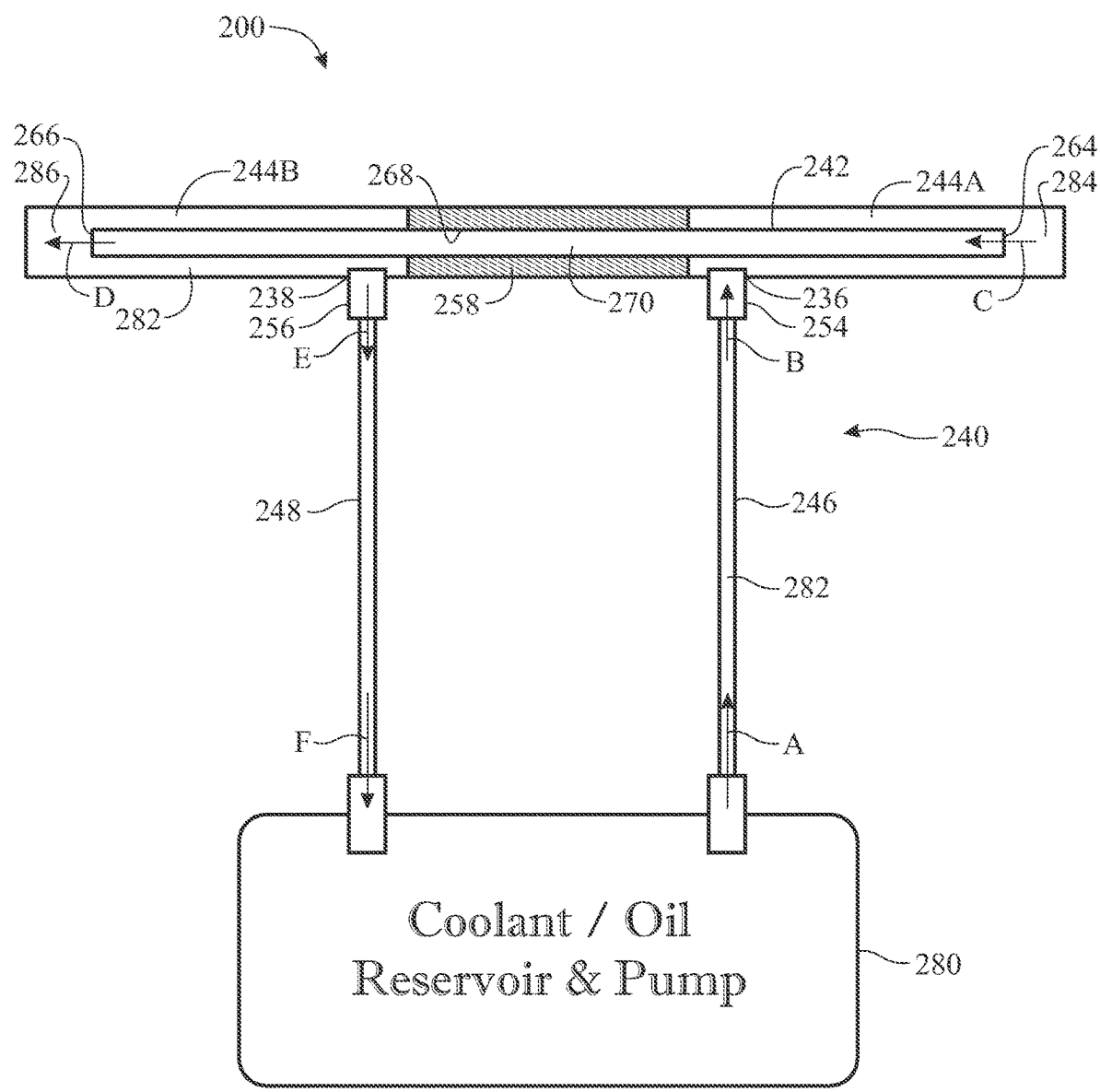
FIG. 8 presents a schematic diagram of the handlebar heating system of FIG. 5.

Referring now to FIGS. 7 and 8, in use, a source of heated fluid 280 is provided from the vehicle similar to that described hereinabove. Heated fluid 282 passes through the inlet tube 246 in the direction of arrow A and through the inlet pipe 254 in the direction of arrow B directly into the internal cavity 244A in the handlebar member 212. The heated fluid 282 circulates within the transition portion 226 and the second end portion 220 to heat the handgrip 216. The heated fluid 282 then enters a gap 284 formed between the end cap 262 and the inlet end 264 of the internal tube 242 and passes into the internal tube 242 in the direction of arrow C. The heated fluid 282 flows through the internal tube 242 including through the central portion 270 located within the central blocking element 258 thereby passing the heated fluid from the internal cavity 244A to the internal cavity 244B. The heated fluid 282 exits the outlet end 266 of the internal tube 242 in the direction of arrow D, then enters a gap 286 formed between the end cap 260 and the outlet end 266 of the internal tube 242, and circulates within the internal cavity 244B to heat the handgrip 216. Thereafter, the heated fluid 282 passes through the outlet pipe 256 in the direction of arrow E and returns to the source of heated fluid 280 through the outlet pipe 256 in the direction of arrow F. This completes the circuit of heated fluid 282 through the handlebar heating system 200.

By incorporating the central blocking element 258 into the handlebar assembly 210, the heat of the heated fluid 282 is further efficiently distributed to the handgrips 214 and 216 as heat loss through the central mounting portion 222 of the handlebar member 212 is minimized.

In some embodiments, the handlebar heating system can further include a control valve for controlling the amount of fluid entering the handlebar assembly, and thus adjusting the handlebar temperature and/or switching the handlebar heating on and off. In some embodiments, the control valve can be mechanical and manually operated (e.g. a manual ball valve). In other embodiments, the control valve can be pneumatically, electrically or electronically operated (e.g. an electronic solenoid valve or an electronic actuated ball valve). In some embodiments, the pneumatically, electrically or electronically operable control valve may be operated to different positions by user operation of a user-operable control (e.g. a rotatable knob, a pivotable handle, a switch, or a button), allowing the user to selectively adjust the handlebar temperature. Alternatively or additionally, the handlebar heating system can include at least one temperature sensor for sensing the fluid and/or handlebar temperature; the control valve can communicate with the at least one temperature sensor and can operate responsively to the temperature sensing, automatically adjusting the handlebar temperature. In some embodiments, the control valve can be arranged at or on the inlet tube 140, 246, the first elbow 150 or inlet pipe 254, or the inlet port 136, 236.

Figure 9:
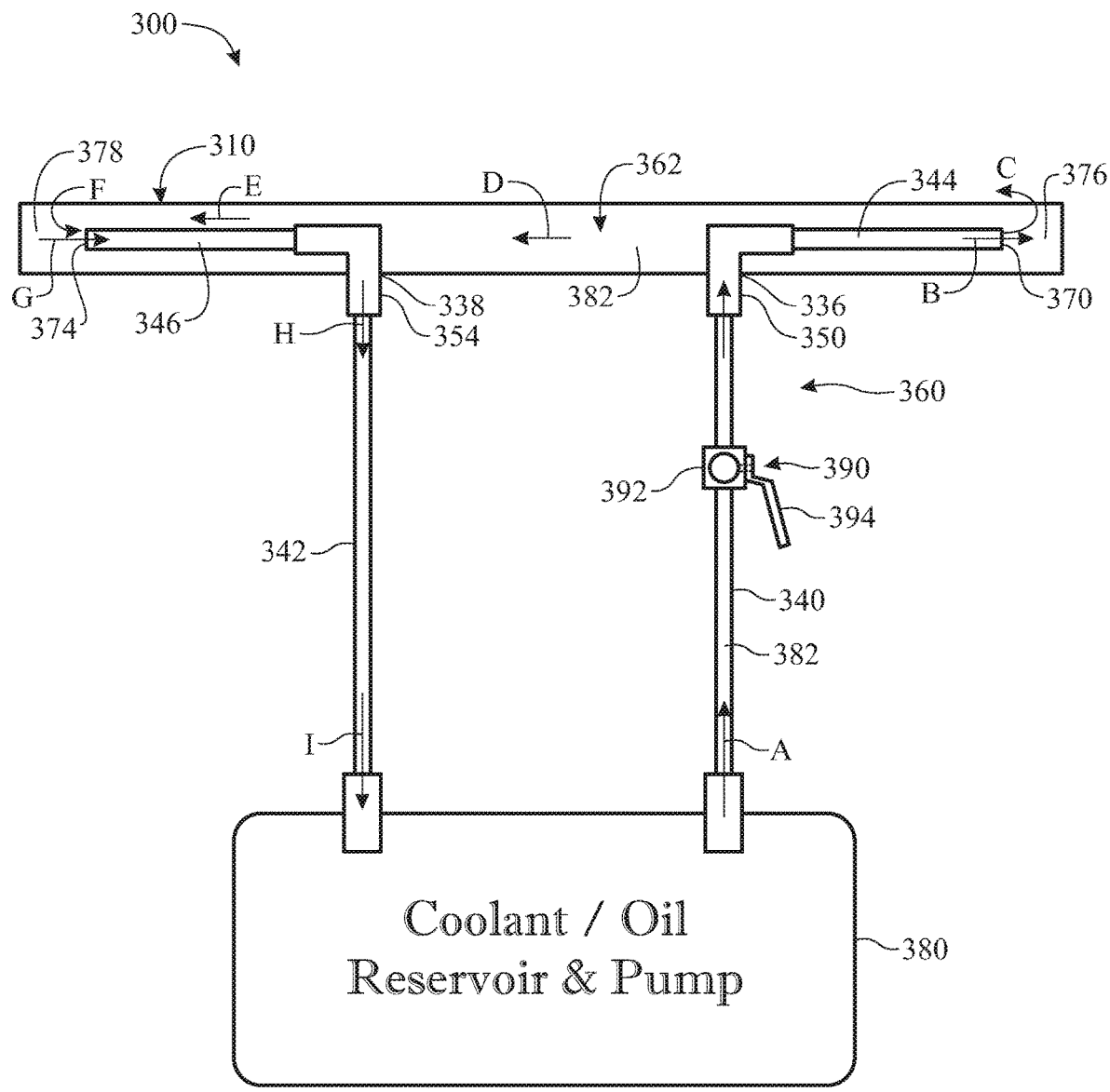
FIG. 9 presents a schematic diagram of a handlebar heating system in accordance with a third illustrative embodiment of the invention.

For example, the illustration of FIG. 9 shows a schematic diagram of a handlebar heating system 300 in accordance with a third illustrative embodiment of the invention. The illustrated handlebar heating system 300 is similar to the handlebar heating system 100 of FIGS. 1 through 4, and like features of the handlebar heating system 300 and the handlebar heating system 100 are numbered the same except preceded by the numeral '3'. As shown, the handlebar heating system 300 of the present embodiment further includes a manually-operable control valve 390 arranged on the inlet tube 340. The control valve 390 comprises a ball-valve mechanism 392 and a user-operable handle 394 coupled to the ball-valve mechanism 392. A user can selectively operate the handle 394 to adjust the amount of fluid passing through the control valve 390 and thus being fed to the handlebar assembly 310.

Alternative embodiments are contemplated to those shown in the drawings. For instance, the end caps 156, 158, 260, 262 may be replaced with any type of sealing closure which terminates the handlebar member 112, 212. For example, the sealed closure may consist of a threaded plug which threads into or onto the end of the handlebar member 112, 212. In other examples, the sealing closure may consist of a plug which fits into or onto the handlebar member 112, 212 by friction fitting, welding, or any other applicable non-threaded attachment. The sealing closure may include an outer thread or other fastener to facilitate attaching external components to the handlebar member; for instance and without limitation, a hand guard may be attached to the sealing closure.

Since many modifications, variations, and changes in detail can be made to the described preferred embodiments of the invention, it is intended that all matters in the foregoing description and shown in the accompanying drawings be interpreted as illustrative and not in a limiting sense.

Thus, the scope of the invention should be determined by the appended claims and their legal equivalents.

What is claimed is:

1. A handlebar heating system for circulating heated fluid through a handlebar of a vehicle, comprising:
   a handlebar assembly including:
   a hollow handlebar member defining an internal cavity, the handlebar member including opposite first and second end portions configured to be gripped by a user's hands, the internal cavity comprising a first cavity section arranged at the first end portion and a second cavity section arranged at the second end portion,
   a fluid inlet port and a fluid outlet port formed through the handlebar member, the fluid inlet port and the fluid outlet port in fluid communication with the first cavity section and the second cavity section of the internal cavity, respectively,
   a central blocking element positioned within the handlebar member, and
   an internal tube positioned entirely within the handlebar member, the internal tube extending from the first cavity section to the second cavity section through the central blocking element; wherein
   the central blocking element sealingly contacts the hollow handlebar member and the internal tube thereby separating and isolating the first cavity section from the second cavity section, wherein fluid communication between the first and second cavity sections is provided by the internal tube extending through the central blocking element; and further wherein
   a fluid passageway is provided from the fluid inlet port to the fluid outlet port via the first and second cavity sections and through the internal tube.

2. The handlebar heating system of claim 1, wherein the heated fluid is vehicle engine oil.

3. The handlebar heating system of claim 1, wherein the heated fluid is vehicle engine coolant.

4. The handlebar heating system of claim 1, wherein the fluid inlet port and the fluid outlet port are located in horizontally spaced relation to each other on an underside of a central portion of the hollow handlebar member.

5. The handlebar heating system of claim 1, wherein the first and second end portions are made of at least one thermally conductive material.

6. The handlebar heating system of claim 1, further comprising a first thermally conductive grip and a second thermally conductive grip fitted over the first and second end portions of the handlebar member, respectively.

7. The handlebar heating system of claim 6, wherein each thermally conductive grip comprises a thermally conductive flange on an inner end thereof.

8. The handlebar heating system of claim 1, wherein the fluid inlet port and the fluid outlet port are configured to disconnectably connect to a fluid inlet tube and a fluid outlet tube, respectively, wherein said fluid inlet tube and fluid outlet tube are external to the handlebar assembly.

9. The handlebar heating system of claim 1, wherein the fluid inlet port is arranged in the first cavity section and the fluid outlet port is arranged in the second cavity section.

10. The handlebar heating system of claim 1, wherein a first end of the internal tube is arranged at a distal end of the first cavity section and an opposite, second end of the internal tube is arranged at a distal end of the second cavity section, wherein the internal tube provides fluid communication between the distal end of the first cavity section and the distal end of the second cavity section.

11. The handlebar heating system of claim 1, wherein the central blocking element is formed of a thermally-insulating material.

12. The handlebar heating system of claim 1, further comprising a control valve for controlling the amount of fluid entering the handlebar assembly via the fluid inlet port.

13. A handlebar heating system for circulating heated fluid through a handlebar of a vehicle, comprising:
   a handlebar assembly including:
   a hollow handlebar member defining an internal cavity, the handlebar member including a central portion, the handlebar member further including opposite first and second end portions configured to be gripped by a user's hands, the internal cavity comprising a first cavity section arranged at the first end portion and a second cavity section arranged at the second end portion, wherein the first and second cavity sections comprise a respective distal end and a respective proximal end arranged closer to the central portion than the respective distal end,
   a fluid inlet port and a fluid outlet port formed through the handlebar member, the fluid inlet port and the fluid outlet port in fluid communication with the first cavity section and the second cavity section of the internal cavity, respectively,
   a central blocking element positioned within the central portion of the handlebar member, and
   an internal tube positioned entirely within the handlebar member, the internal tube extending from the distal end of the first cavity section to the distal end of the second cavity section through the central blocking element; wherein
   the central blocking element sealingly contacts the hollow handlebar member and the internal tube thereby separating and isolating the first cavity section from the second cavity section, wherein fluid communication between the distal end of the first cavity section and the distal end of the second cavity section is provided by the internal tube extending through the central blocking element; and further wherein
   a fluid passageway is provided from the fluid inlet port to the fluid outlet port via the first and second cavity sections and through the internal tube.

14. A handlebar heating system for circulating heated fluid through a handlebar of a vehicle, comprising:
   a handlebar assembly including:
   a hollow handlebar member defining an internal cavity, the handlebar member including a central portion, the handlebar member further including opposite first and second end portions configured to be gripped by a user's hands, the internal cavity comprising a first cavity section arranged at the first end portion and a second cavity section arranged at the second end portion, wherein the first and second cavity sections comprise a respective distal end and a respective proximal end arranged closer to the central portion than the respective distal end,
   a fluid inlet port and a fluid outlet port formed through the handlebar member, the fluid inlet port and the fluid outlet port in fluid communication with the first cavity section and the second cavity section of the internal cavity, respectively,
   a central blocking element formed of a thermally-insulating material and positioned within the central portion of the handlebar member, and
   an internal tube positioned entirely within the handlebar member, the internal tube extending from the distal end of the first cavity section to the distal end of the second cavity section through the central blocking element; wherein the central blocking element sealingly contacts the hollow handlebar member and the internal tube thereby separating and isolating the first cavity section from the second cavity section, wherein fluid communication between the distal end of the first cavity section and the distal end of the second cavity section is provided by the internal tube extending through the central blocking element; and further wherein a fluid passageway is provided from the fluid inlet port to the fluid outlet port via the first and second cavity sections and through the internal tube.

* * * * *